United States Patent

Metz

[11] Patent Number: 6,135,483
[45] Date of Patent: Oct. 24, 2000

[54] VEHICLE SUSPENSION SYSTEM

[75] Inventor: Stewart N. Metz, Broken Arrow, Okla.

[73] Assignee: Crane Carrier Company, Tulsa, Okla.

[21] Appl. No.: 09/126,522

[22] Filed: Jul. 30, 1998

[51] Int. Cl.[7] .................................................. B62D 53/06
[52] U.S. Cl. ............................................................ 280/439
[58] Field of Search ................................. 280/433, 438.1, 280/439, 440, 441.1

[56] References Cited

U.S. PATENT DOCUMENTS

| | | | |
|---|---|---|---|
| D. 308,351 | 6/1990 | Fry et al. ................................. | D12/13 |
| 2,536,337 | 1/1951 | Whitlow .................................. | 280/124 |
| 2,746,766 | 5/1956 | Nallinger ................................ | 280/124 |
| 2,847,230 | 8/1958 | Hendrickson et al. ................ | 280/406 |
| 2,968,496 | 1/1961 | Gouirand ................................ | 280/439 |
| 3,081,109 | 3/1963 | Davies et al. .......................... | 280/423 |
| 3,207,338 | 9/1965 | Felburn ................................ | 280/438.1 |
| 3,315,980 | 4/1967 | Gorge et al. ........................... | 280/124 |
| 3,352,374 | 11/1967 | Vivian ................................... | 180/79.2 |
| 3,494,632 | 2/1970 | Bostrom ................................ | 280/104.5 |
| 3,572,748 | 3/1971 | Vivian ................................... | 280/124 |
| 3,717,273 | 2/1973 | Berends ................................ | 280/425.1 |
| 3,732,942 | 5/1973 | Hobbensiefken ........................ | 180/11 |
| 3,746,363 | 7/1973 | Borns ................................... | 280/124 |
| 3,888,513 | 6/1975 | Pilz et al. ............................. | 280/421 |
| 3,940,167 | 2/1976 | Pilz ....................................... | 280/456 |
| 4,029,335 | 6/1977 | Cady et al. ............................ | 280/439 |
| 4,111,273 | 9/1978 | Blackburn et al. .................... | 180/14 |
| 4,161,329 | 7/1979 | Pilz et al. ............................. | 280/474 |
| 4,270,630 | 6/1981 | Karkau ................................... | 187/9 |
| 4,379,572 | 4/1983 | Hedenberg .............................. | 280/711 |
| 4,391,455 | 7/1983 | Fagerstedt ............................. | 280/407 |
| 4,541,653 | 9/1985 | Raidel ................................... | 280/711 |
| 4,566,716 | 1/1986 | Modat ................................... | 280/439 |
| 4,580,797 | 4/1986 | Ericsson ................................ | 280/6 |
| 4,718,692 | 1/1988 | Raidel ................................... | 280/713 |
| 4,722,549 | 2/1988 | Raidel ................................... | 280/711 |
| 4,762,337 | 8/1988 | Raidel ................................... | 280/688 |
| 4,807,713 | 2/1989 | Smith et al. .......................... | 180/89 |
| 4,842,302 | 6/1989 | Lauronen et al. ..................... | 280/704 |
| 4,991,673 | 2/1991 | Ericsson ................................ | 180/41 |
| 5,020,820 | 6/1991 | Renner et al. ........................ | 280/439 |
| 5,255,754 | 10/1993 | Lauronen ............................... | 180/24 |
| 5,328,198 | 7/1994 | Adams ................................... | 280/439 |
| 5,330,222 | 7/1994 | Halverson et al. .................... | 280/438 |
| 5,492,351 | 2/1996 | Salo ...................................... | 280/81 |
| 5,579,860 | 12/1996 | Halverson et al. .................... | 180/89 |
| 5,626,356 | 5/1997 | Harwood .............................. | 280/405.1 |

*Primary Examiner*—Kevin Hurley
*Attorney, Agent, or Firm*—Head, Johnson & Kachigian

[57] ABSTRACT

A suspension system for a vehicle having a frame and a rear axle for wheels. The suspension system includes a pair of trailing arms, each trailing arm extending from the frame and connected to the rear axle. A pair of torque rods, each has a first end pivotally extending from the tractor frame and a second end. A stabilizer plate has a first end connected to the frame and a pair of second ends. A fifth wheel mounting bracket pivotally connects each torque rod second end and pivotally connected to the stabilizing plate second ends. A load mechanism extends between the trailing arms and the mounting bracket to raise or lower the fifth wheel mounting bracket while remaining parallel.

7 Claims, 5 Drawing Sheets

VEHICLE SUSPENSION SYSTEM

BACKGROUND OF THE INVENTION

1. Field of the Invention

The present invention relates to suspension systems for tractor trailer vehicles. In particular, the present invention relates to a suspension system for a terminal tractor which is adapted for maneuvering a trailer in a confined area and for use with various loads.

2. Prior Art

In a typical tractor trailer configuration, the forward end of the trailer is disconnectedly attached to the tractor. Tractor trailer designs are well known which utilize a saddle or fifth wheel on which the front part of the semi-trailer rests. The fifth wheel is usually above and is supported by the rear axle of the tractor.

If no suspension system is employed on the tractor, a very rough ride ensues, particularly over rough terrain.

It is advantageous to have a suspension system for the tractor vehicle which gives an acceptable ride when the tractor is traveling alone, with an empty semi-trailer, or with a fully loaded semi-trailer.

It is also advantageous to direct the force of the load on the fifth wheel to the rear axle and not to the frame.

One approach to this problem is shown in Renner et al. (U.S. Pat. No. 5,020,820) which utilizes a subframe pivoted to the main vehicle frame. The load on the fifth wheel is transmitted to the rear axle of the tractor through an A-frame.

In certain applications, such as with a terminal tractor, short trips are made shuttling trailers on short trips. The tractor can move the trailer without retracting the support legs. The fifth wheel must be frequently lowered and raised to attach trailers to the tractor.

Accordingly, it is a principal object and purpose of the present invention to stabilize the vehicle suspension as the axle moves up and down under various loads.

It is a principal object and purpose of the present invention to direct the entire trailer load on the fifth wheel to load cylinders and then directly to trailing arms.

It is a further object and purpose of the present invention to provide a suspension system wherein the fifth wheel remains parallel to the frame at all times during raising or lowering.

SUMMARY OF THE INVENTION

The present invention is directed to a suspension system for a vehicle having an elongated frame and a rear axle onto which wheels may be mounted.

The suspension system includes a pair of trailing arms extending from the underside of the frame. The trailing arms are parallel to each other in normal condition but operate independently. Each trailing arm is pivotally connected at a first end to the frame by a rubber bushing which is mounted on a plate extending from the frame. The opposite, second end of each trailing arm is connected to the rear axle and is held in place by an axle housing and is, thus, juxtaposed between the trailing arms and the tractor frame.

The suspension system also includes a pair of torque rods. Each torque rod includes a first end pivotally extending from the tractor frame at pivot joints which are connected to the frame at a cross member. Each torque rod also has a second end pivotally connected to a fifth wheel mounting bracket.

A fifth wheel is supported on or connected to the fifth wheel mounting bracket. A trailer will be connected to the tractor at the fifth wheel as is well known.

A stabilizer plate has a first end pivotally connected to the frame at a pivot joint. The stabilizer plate also has at least one second end pivotally connected to the fifth wheel mounting bracket at a pair of pivot joints. Since the stabilizer plate is pivotally connected to the fifth wheel mounting bracket, it will travel in an arc.

A pair of hydraulic load cylinders mounted on the trailing arms extends between the trailing arms and the fifth wheel mounting bracket in order to raise or lower the fifth wheel mounting bracket and, in turn, the fifth wheel. Accordingly, the force of the load of the trailer is directed from the fifth wheel to the rear axle and not to the frame.

The stabilizer plate, the cross member of the frame, the torque rods and the fifth wheel mounting bracket form a parallelogram that is pivotal at each connection. Accordingly, as the fifth wheel mounting bracket travels between the lowered position and the raised position, it remains parallel to the frame at all times.

DETAILED DESCRIPTION OF THE PREFERRED EMBODIMENTS

Figure 1:
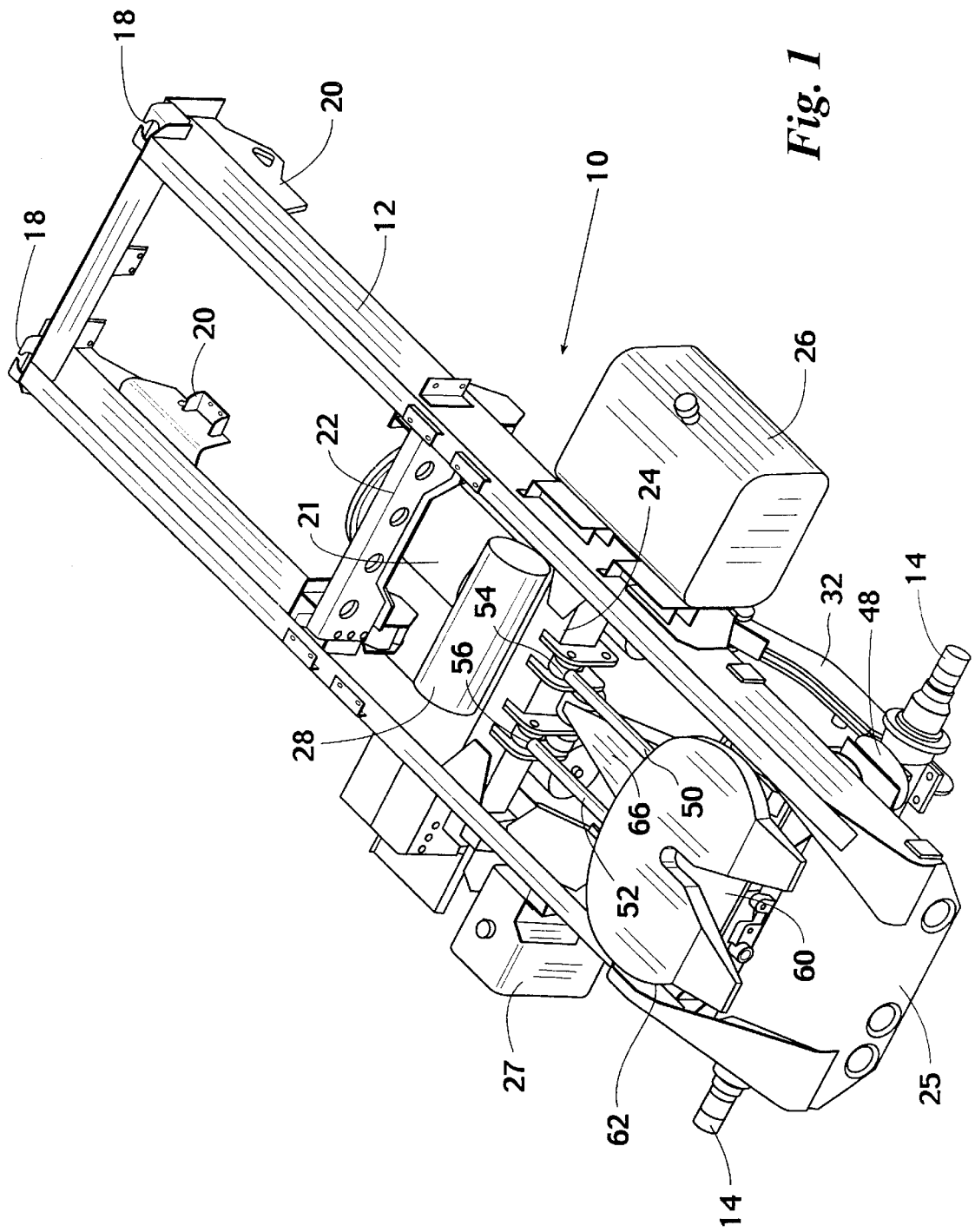
FIG. 1 is a perspective view of a vehicle suspension system with most of the vehicle elements removed or cut away for ease of viewing.
Figure 2:
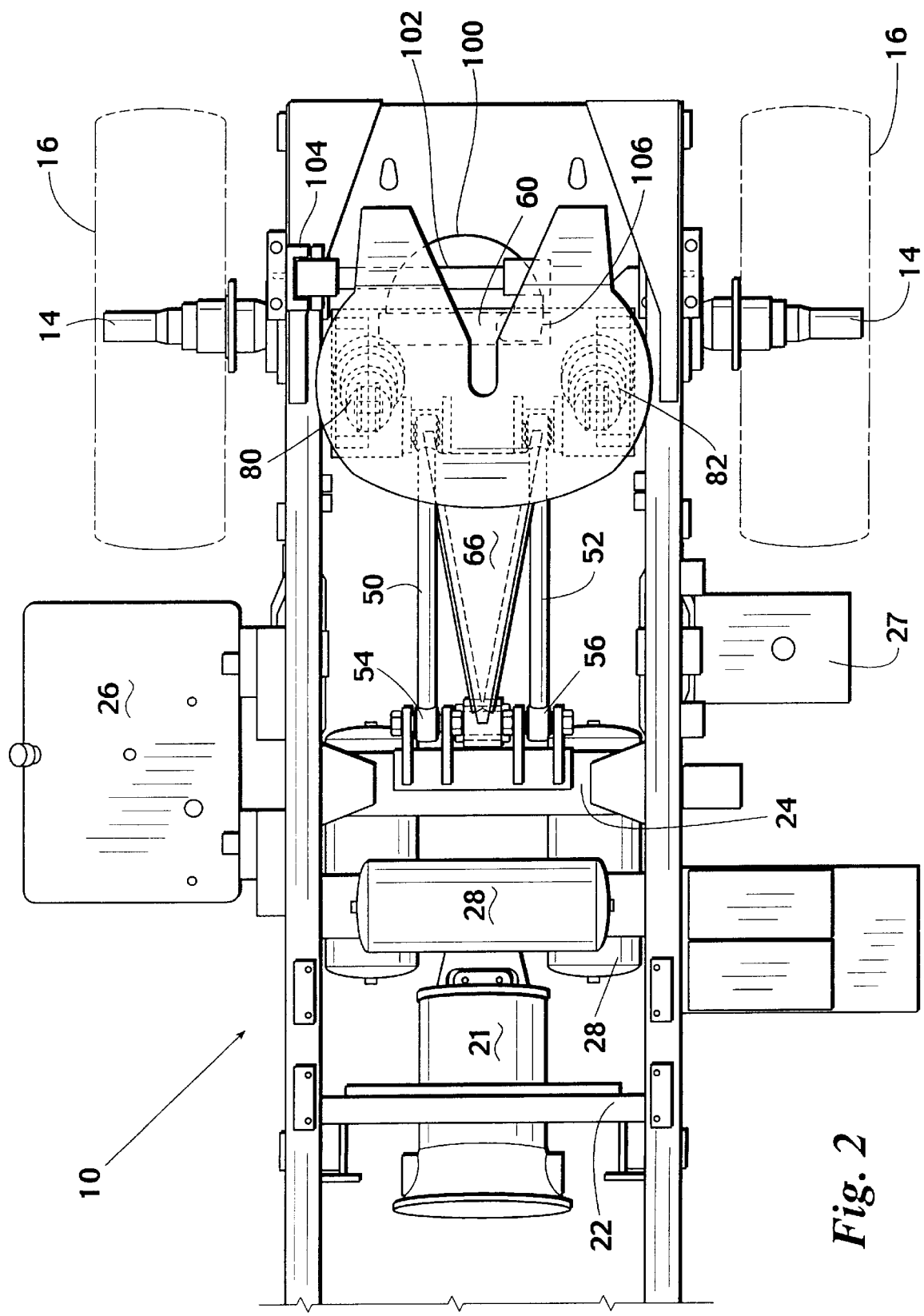
FIG. 2 is a top plan view of a vehicle suspension system shown in FIG. 1.

Referring to the drawings in detail, FIG. 1 is a perspective view and FIG. 2 is a top plan view of a suspension system 10 for a vehicle constructed in accordance with the present invention. The suspension system 10 may be employed on different types of vehicles. One application is on a terminal tractor to move trailers in a yard. The tractor will be required to maneuver in confined areas and will alternate between light loads and heavy loads. The trailers may be moved short distances without retracting the trailer support legs.

Most of the vehicle elements have been removed or cut away in the drawings for ease of viewing of the present invention. The vehicle itself as seen in FIGS. 1 and 2 includes an elongated frame 12 and a rear axle 14 onto which road engaging wheels or tires 16 (not shown in FIG. 1) are mounted. The wheels are illustrated by dashed lines 16 in FIG. 2.

The frame 12 may include pivot mountings 18 for a front cab (not shown), engine mounts 20, a transmission housing 21, a first frame cross member 22, a second frame cross member 24 and a rear skid plate 25. Mounted on the frame 12 are an engine fuel tank 26, a hydraulic tank 27 for the hydraulic system, and air tanks 28 for vehicle air brakes and air cushions (to be described). Also visible in FIG. 2 is an axle housing 100 surrounding the rear axle 14. A lateral torque rod 102 assists in preventing the rear axle 14 from moving laterally. The lateral torque rod 102 is held in place by a frame mounting bracket 104 secured to the frame 12 and a torque rod mounting bracket 106 on the axle housing 100. It will be appreciated that the frame 12 and its associated elements are well known and may take various configurations within the scope of the present invention.

The suspension system 10 includes a pair of trailing arms 30 and 32 extending from the underside of the frame 12. The trailing arms are parallel to each other in normal condition but operate independently. Each trailing arm 30 and 32 is pivotally connected at its first end to the frame 12 by a rubber bushing 34 and 36, respectively, which is mounted on a plate 40 and 42 extending from the frame. Each trailing arm, thus, moves rotationally about an axis at its bushing.

Figure 3:
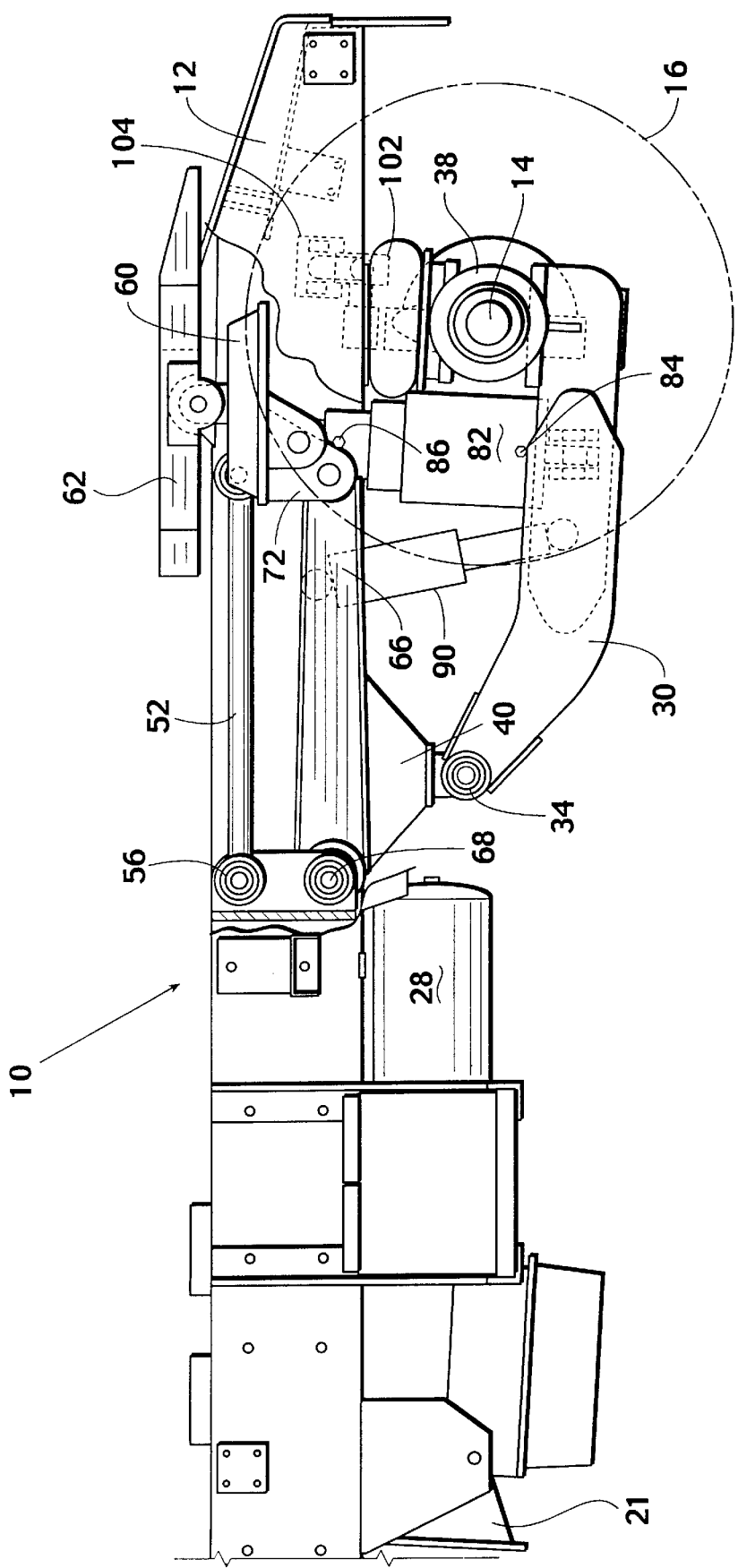
FIG. 3 is a partial, side elevational view of the suspension system shown in FIG. 1 with a fifth wheel in the lowered position.

FIG. 3 is a side elevation view of the suspension system shown in FIGS. 1 and 2. The opposite, second end of each trailing arm 30 and 32 is connected to the rear axle 14.

The rear axle 14 is held in place by an axle housing 38 and is, thus, juxtaposed between the trailing arms 30 and 32 and the tractor frame 12. Between the rear axle 14 and the frame 12 are a pair of air cushions 46 and 48. The air cushions 46 and 48 are in fluid communication with the air pressure system of the vehicle. Movement of the rear axle 14, such as by a wheel encountering rough terrain, is accommodated by the trailing arms.

The suspension system 10 also includes a pair of torque rods 50 and 52 as best seen in FIGS. 1 and 2. Each torque rod 50 and 52 includes a first end pivotally extending from the tractor frame 12 at pivot joints 54 and 56, respectively. The pivot joints 54 and 56 are connected to the frame at cross member 24. Each torque rod, thus, moves rotationally about an axis of its pivot joint.

Each torque rod 50 and 52 also has a second end pivotally connected to a fifth wheel mounting bracket 60. The torque rods 50 and 52 are parallel to each other in normal condition but operate independently. Because the fifth wheel mounting bracket is pivotally connected to the torque rods, the fifth wheel mounting bracket will travel in an arc.

A fifth wheel 62 is supported on and connected to the fifth wheel mounting bracket 60. The trailer (not shown) is connected to the tractor at the fifth wheel by a support element, as is well known.

A stabilizer plate 66 has a first end pivotally connected to the frame 12 at a plate pivot joint 68. The stabilizer plate 66 also has a pair of second ends pivotally connected to the fifth wheel mounting bracket 60 at pivot joints 72 and 74. The stabilizer plate is pivotally connected to the fifth wheel mounting bracket so it will travel in an arc as it is raised or lowered. The stabilizer plate 66 will help limit lateral movement of the mounting bracket yet will accommodate a small amount of twisting.

A pair of load cylinders 80 and 82 mounted on the trailing arms and extend between the trailing arms and the mounting bracket to raise or lower the mounting bracket 60. In the present embodiment, the load cylinders are two stage hydraulic cylinders driven by the engine hydraulic system.

Finally, a shock absorber 90 (one of a pair of shock absorbers visible in FIG. 3) extends between the frame 12 and the trailing arm 30.

Returning to a consideration of FIG. 3, the fifth wheel mounting bracket and fifth wheel are shown in the lowered position. The load cylinders 80 and 82 are fully retracted so that the fifth wheel may be brought under a trailer. Once the trailer is in place, the load cylinders may be extended.

Figure 4:
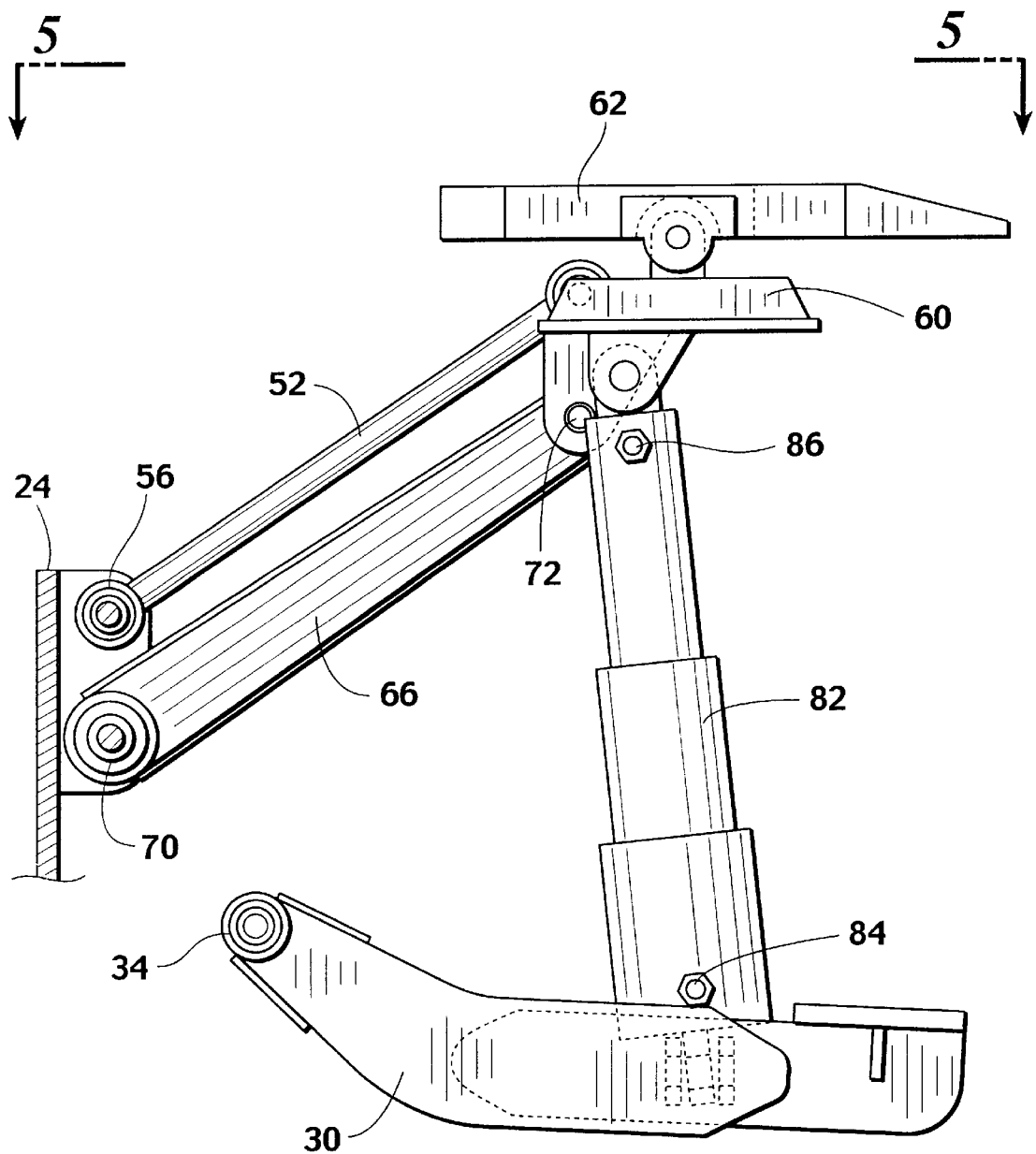
FIG. 4 is a portion of the suspension system of the present invention with the fifth wheel in the fully raised, upper position.

FIG. 4 shows the fifth wheel mounting bracket 60 and fifth wheel 62 moved to the upper or raised position. The load cylinders 80 and 82 have been fully extended. The balance of the frame and other elements have been removed for clarity. Each cylinder will include a first, power up port 84 and a second power down port 86 connected to the hydraulic system of the vehicle (not shown). The load cylinders 80 and 82 may be two stage cylinders and may be fluidly connected (not shown).

The hydraulic system may be in four positions; power up, neutral, power down and float. It will be appreciated that the force of the load is delivered through the cylinders to the trailing arms.

Figure 5:
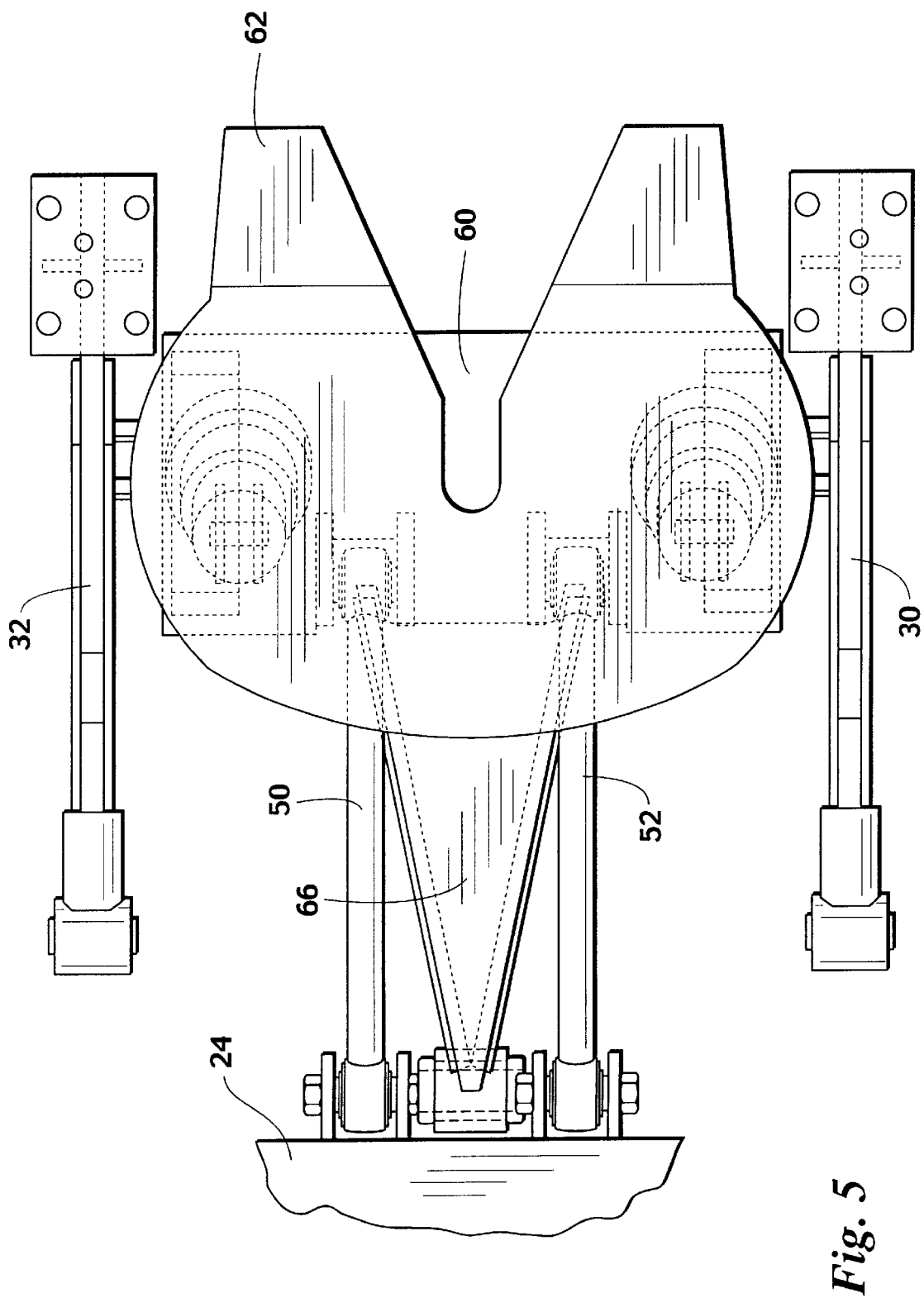
FIG. 5 is a sectional view taken along section line 5—5 of FIG. 4.

FIG. 5 is a top plan view of the fifth wheel 62 and fifth wheel mounting bracket 60 in the raised position.

It will be seen that the stabilizer plate 66, the cross member 24 of the frame, the torque rods 50 and 52 and the fifth wheel mounting bracket 60 form a parallelogram that is pivotal at each connection. Accordingly, as the fifth wheel mounting bracket 60 travels from the lowered position to the raised position, it remains parallel to the frame at all times. Accordingly, there is no angular movement of the fifth wheel mounting bracket 60 and no angular movement of the fifth wheel 62. It is believed this will result in a better connection with the trailer and put less stress on the connection.

Whereas, the present invention has been described in relation to the drawings attached hereto, it should be understood that other and further modifications, apart from those shown or suggested herein, may be made within the spirit and scope of this invention.

What is claimed is:

1. A suspension system for a vehicle having a frame and a rear axle for wheels, which suspension system comprises:

a pair of trailing arms, each trailing arm extending from said frame and connected to said rear axle;

a pair of torque rods, each torque rod having a first end pivotally extending from said tractor frame and a second end;

a stabilizer plate having a first end pivotally connected to said frame and at least one second end;

a fifth wheel mounting bracket pivotally connected to each said torque rod second end and pivotally connected to said stabilizer plate second end; and load means extending between said trailing arms and said mounting bracket to raise or lower said fifth wheel mounting bracket without angular movement.

2. A suspension system for a vehicle as set forth in claim 1 wherein said load means includes a pair of hydraulic cylinders.

3. A suspension system for a vehicle as set forth in claim 2 wherein each said hydraulic cylinder is fluidly connected to the other to allow fluid flow therebetween.

4. A suspension system for a vehicle as set forth in claim 1 wherein each said trailing arm is pivotally connected to said frame by a bushing.

5. A suspension system for a vehicle as set forth in claim 1 including a pair of shock absorber cylinders.

6. A suspension system for a vehicle as set forth in claim 1 wherein each said rear axle is between said trailing arm and said tractor frame.

7. A suspension system for a vehicle as set forth in claim 1 including a lateral torque rod extending between an axle housing and said frame to prevent lateral movement of said rear axle.

* * * * *